United States Patent [19]

Hatanaka et al.

[11] Patent Number: 5,451,103
[45] Date of Patent: Sep. 19, 1995

[54] PROJECTOR SYSTEM

[75] Inventors: Masato Hatanaka, Saitama; Yuji Nagata; Eiji Takahashi, both of Tokyo, all of Japan

[73] Assignee: Sony Corporation, Tokyo, Japan

[21] Appl. No.: 222,957

[22] Filed: Apr. 5, 1994

[30] Foreign Application Priority Data

Apr. 6, 1993 [JP] Japan .................................. 5-101849

[51] Int. Cl.⁶ .............................................. G03B 21/28
[52] U.S. Cl. ........................................ 353/31; 353/34; 353/37
[58] Field of Search ..................... 353/31, 34, 37, 98, 353/99, 33

[56] References Cited

U.S. PATENT DOCUMENTS 4,983,032 1/1991 Van Den Brandt .................. 353/37
5,311,227 5/1994 Takayasu et al. .

Primary Examiner—William A. Cuchlinski, Jr.
Assistant Examiner—William C. Dowling
Attorney, Agent, or Firm—Jay H. Maioli

[57] ABSTRACT

A projector rear is simple in structure uses reflection type liquid crystal plates to project images on a screen. R light emitted by a light source is directed to a first liquid crystal plate via a first dichroic mirror. Light reflected from the first liquid crystal plate is reflected toward a projection axis by the first dichroic mirror. B light transmitted through the first dichroic mirror is reflected by a second dichroic mirror and impinges on a second liquid crystal plate. Light reflected by this second liquid crystal plate is again reflected toward the projection axis by the second dichroic mirror. G light is made to directly enter a third liquid crystal plate. G light reflected by the third liquid crystal plate travels along the projection axis. The angular positional relations among optical elements are so set that the angle of incidence to the normal to each dichroic mirror is close to the angle of reflection.

8 Claims, 8 Drawing Sheets

PROJECTOR SYSTEM

FIELD OF THE INVENTION

The present invention relates to a projector for projecting color image signals, for example, onto a screen, using reflection type liquid crystal devices or the like.

RELATED ART

A liquid crystal (LC) projector is known which decomposes light emitted from a light source into three primary colors, e.g., red (R), green (G), and blue (B), by means of two dichroic mirrors, projects the R, G, B light rays onto three liquid crystal plates, respectively, modulates the transmitted colors with image signals, and combines them by the mirrors to thereby project color image signals onto a screen.

This LC projector is a small-sized unit but capable of projecting a large area image on a reflection or projection type screen. However, this projector has the following problems.

Generally, a transmission type liquid crystal plate is composed of liquid crystal devices consisting of TFTs (thin film transistors). That is, a large number of transistors are provided to activate individual pixels. Therefore, the effective incident area is small, i.e., the aperture ratio is quite low. Also, polarizers mounted at the front and rear surfaces, respectively, lower the transmittance a light. Consequently, it is necessary to use a light source of high illuminance in order to enhance the brightness of the image projected on the screen. In consequence, the efficiency decreases.

Also, it is necessary that the light emitted from the light source be divided into three primary colors, that these colors be directed to their respective liquid crystal plates, and that colors transmitted through the plates be recombined by dichroic mirrors. Therefore, the optical system is too complex. This makes it difficult to render the apparatus small.

Accordingly, a projector using reflection type liquid crystal plates as devices for modulating light rays with image signals has been proposed. FIG. 10 shows the optical system of a liquid crystal projector using three reflection type liquid crystal plates. This optical system comprises a white light source 1 consisting of a tungsten-halogen lamp or other light source, an optical lens 2 for collimating the light emitted from the light source 1, and a deflecting beam splitter 3.

The light reflected by the deflecting beam splitter 3 is directed to two dichroic mirrors 4A and 4B which intersect at right angles to each other. The first dichroic mirror 4A reflects only red (R) light. Light reflected by the first dichroic mirror 4A is directed into a first liquid crystal plate 5A. The second dichroic mirror 4B reflects only blue (B) light to a second liquid crystal plate 5C. Light (G) reflected by none of these two dichroic mirrors 4A and 4B travels straight and impinges on a third liquid crystal plate 5B.

Pixels on the three liquid crystal plates 5A, 5B, and 5C are activated by R, G, and B signals of TV signals, for example. Colors which are brightness-modulated by the R, G, and B signals, respectively, and reflected by the liquid crystal plates 5A, 5B, and 5C, respectively, are again reflected by the dichroic mirrors 4A and 4B, pass through the incident optical path rearwardly, and impinge on the deflecting beam splitter 3.

Since the plane of polarization of the light reflected from each liquid crystal plate is rotated through 90°, the light passes through the beam splitter 3 as it is and enters an optical lens system 6, where the light is converged. Then, the light is projected onto a screen 7.

Although the projector using the above-described reflection type liquid crystal plates can have a relatively high light conversion efficiency, the projector has the following problems.

(1) The deflecting beam splitter 3 is very expensive because prisms are required to be combined with high accuracy and because a glass material of high purity is necessary.

(2) The two dichroic mirrors 4A and 4B are positioned to intersect at right angles to each other as shown in FIG. 11. The two mirrors cross at an intersection line L. This line L appears as a seam on the screen, thus impairing the image quality.

SUMMARY OF THE INVENTION

It is an object of the present invention to provide a projector system comprising: a light source emitting light containing R light rays, B light rays, and G light rays; a first image display plate for reflecting incident light to produce first reflected light; a first dichroic mirror which reflects only said R light rays to said first image display plate and reflects said first reflected light to a projection axis off said light source; a second image display plate for reflecting incident light to produce second reflected light; a second dichroic mirror which reflects only the B light rays transmitted through said first dichroic mirror to said second image display plate and reflects said second reflected light toward said projection axis; a third image display plate for reflecting the G light rays transmitted through said second dichroic mirror toward said projection axis, all of said R, B, and G light rays being modulated with image signals supplied to said first and second image display plates; and an optical lens which is located on said projection axis and through which images are projected onto a screen.

The optical axis of the light incident on each dichroic mirror is substantially perpendicular to a plane containing the projection axis and the line normal to the dichroic mirror and lies within a plane containing the projection axis.

The above-described novel structure comprises the two independent dichroic mirrors. A deflecting beam splitter can be dispensed with. Consequently, the number of the components is quite few. Also, the optical system can be made simple. Furthermore, no seam appears on the projected image and so the image quality can be enhanced.

Other objects and features of the invention will appear in the course of the description thereof, which follows.

BRIEF DESCRIPTION OF THE DRAWINGS

FIG. 8b is a top view of the projector shown in FIG. 8a;

DETAILED DESCRIPTION OF THE INVENTION

Figure 1:
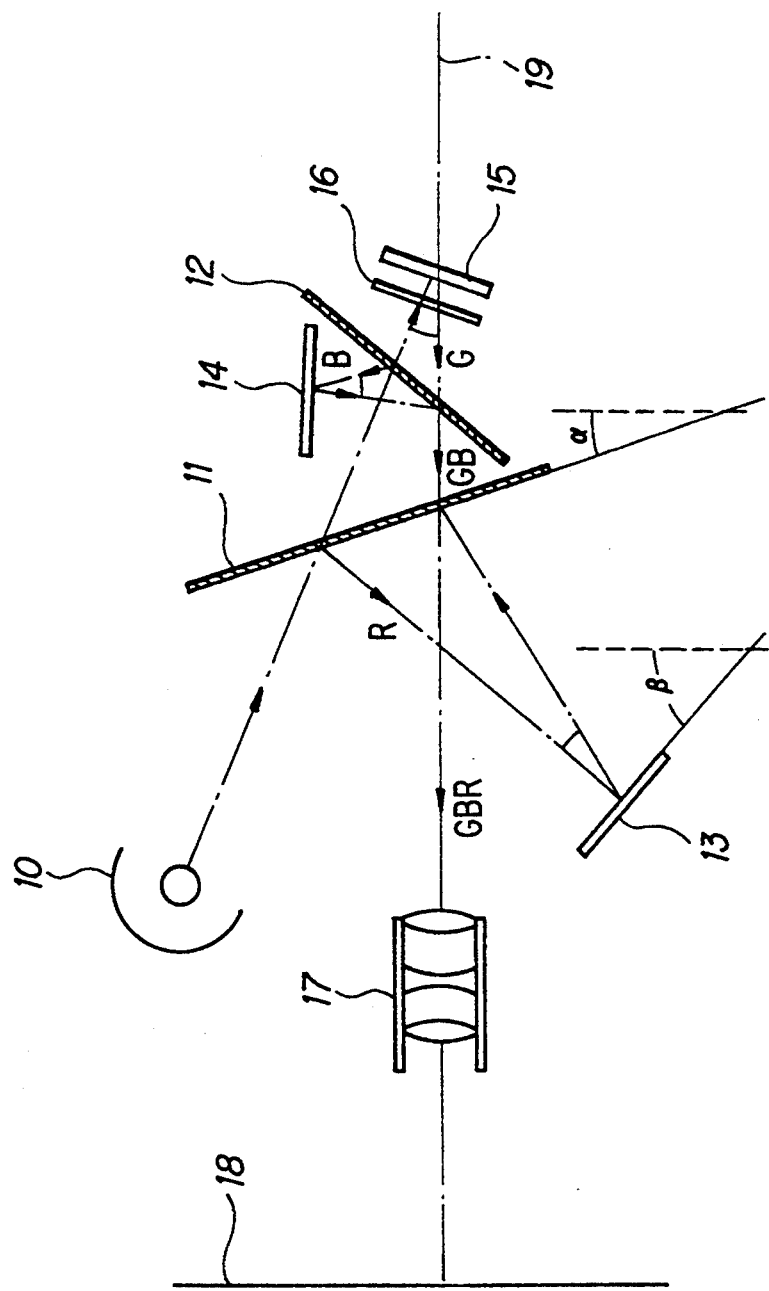
FIG. 1 is a principle diagram of a projector according to the invention, the projector comprising reflection type liquid crystal plates.

FIG. 1 is a principle diagram of a reflection type liquid crystal projector according to the present invention. This projector comprises a white light source 10 consisting of a tungsten-halogen lamp or the like, a first dichroic mirror 11 for reflecting only the red (R) light component of the light emitted from the light source, a second dichroic mirror 12 for reflecting only the blue (B) light component of the light transmitted through the first dichroic mirror 11, and a first liquid crystal plate 13 of the reflection type. Light reflected by the first dichroic mirror 11 is incident on the first liquid crystal plate 13. The first liquid crystal plate 13 is so positioned that reflected light modulated by this liquid crystal plate 13 is reflected toward the first dichroic mirror 11.

Blue light reflected by the second dichroic mirror 12 impinges on a second liquid crystal plate 14 which is so placed that light modulated by this second liquid crystal plate 14 is reflected toward the second dichroic mirror 12.

Light transmitted through the two dichroic mirrors 11, 12 impinges on a third liquid crystal plate 15. Of the light emitted by the light source 10, the green (G) light is projected as a main component onto this third liquid crystal plate. A filter 16 for transmitting only the green light may be mounted in front of the third liquid crystal plate 15.

An optical lens system 17 combines light rays reflected by the two dichroic mirrors 11, 12 and by the reflection type third liquid crystal plate 15 and projects the combined light rays as a focused image onto a screen 18.

The optical system of the novel projector is constructed as described above. The light emitted by the white light source 10 is divided into parts by the two dichroic mirrors. The projector is characterized in that these parts are recombined into a focused image consisting of three primary colors, by using the dichroic mirrors again. In particular, R light separated by the first dichroic mirror 11 is modulated in a two-dimensional plane by the first liquid crystal plate 13 of the reflection type with a TV picture signal, for example. Light reflected by the first liquid crystal plate 13 is reflected again toward the first dichroic mirror 11. The angular positional relation between the first dichroic mirror 11 and the first liquid crystal plate 13 is so set that the light reflected by the first liquid crystal plate 13 travels not to the light source 10 but to a projection axis 19.

In order to obtain these reflective trajectories, the angle $\alpha$ made by the first dichroic mirror 11 is set smaller than the angle $\beta$ made by the first liquid crystal plate 13 as shown in the two-dimensional ray diagram of FIG. 1. As described later, the angle $\alpha$ can be made different from the angle $\beta$ as viewed in a three-dimensional space, i.e., as viewed toward the sheet of the drawing.

The angles of the second dichroic mirror 12 and of the second liquid crystal plate 14 with respect to B light are set, in the same way as in the case with respect to the R light. The dichroic mirror 12 emits B light to the liquid crystal plate 14 and reflects light coming from the liquid crystal plate 14 toward the projection axis 19 off the axis of the incoming light.

Light transmitted through the first and second dichroic mirrors 11 and 12, respectively, consists principally of a green light component. This light is directly directed to the third liquid crystal plate 15 which is slightly tilted similar to the other liquid crystal plates. The third liquid crystal plate 15 is modulated with an image signal. The angular position of the third liquid crystal plate 15 is so set that this plate reflects incoming light toward the projection axis 19 and that this reflected light travels in the same direction as the light reflected by the dichroic mirrors 11 and 12. Therefore, the focus of the optical lens system 17 is adjusted so that image signals of the three primary colors modulated by the liquid crystal plates 13-15 are converged and that these converged image signals create a focused image on the screen 18.

In order to set the reflectivities of the liquid crystal plates 13-15 high, the angle $\theta$ between the optical axis of the light impinging on each liquid crystal plate and the optical axis of the light reflected by each liquid crystal plate should be set to 5°-10°. For this purpose, the angle made between the optical axis of the light emitted from the light source 10 and the optical axis of the light incident on the optical lens system 17 is set to 5°-10°. The third liquid crystal plate 15 is located at the intersection of the optical axis of the light emitted from the light source 10 and an extension line to the optical axis of the optical lens system 17. The first and second dichroic mirrors 11 and 12, respectively, are mounted on the optical path of the light emitted from the light source. The angle between these mirrors is set according to the internal structure of the projector. The first and second liquid crystal plates 13 and 14 are positioned on the optical paths of the light rays reflected from the dichroic mirrors 11 and 12, respectively. The liquid crystal plates are tilted in such a way that light reflected from these plates is inclined at 5°-10°.

If light rays incident on the dichroic mirrors 11 and 12 pass through a plane which is perpendicular to the inclined surfaces of the dichroic mirrors, then the light-transmitting characteristics of the dichroic mirrors with respect to wavelengths can be maintained well.

Figure 2:
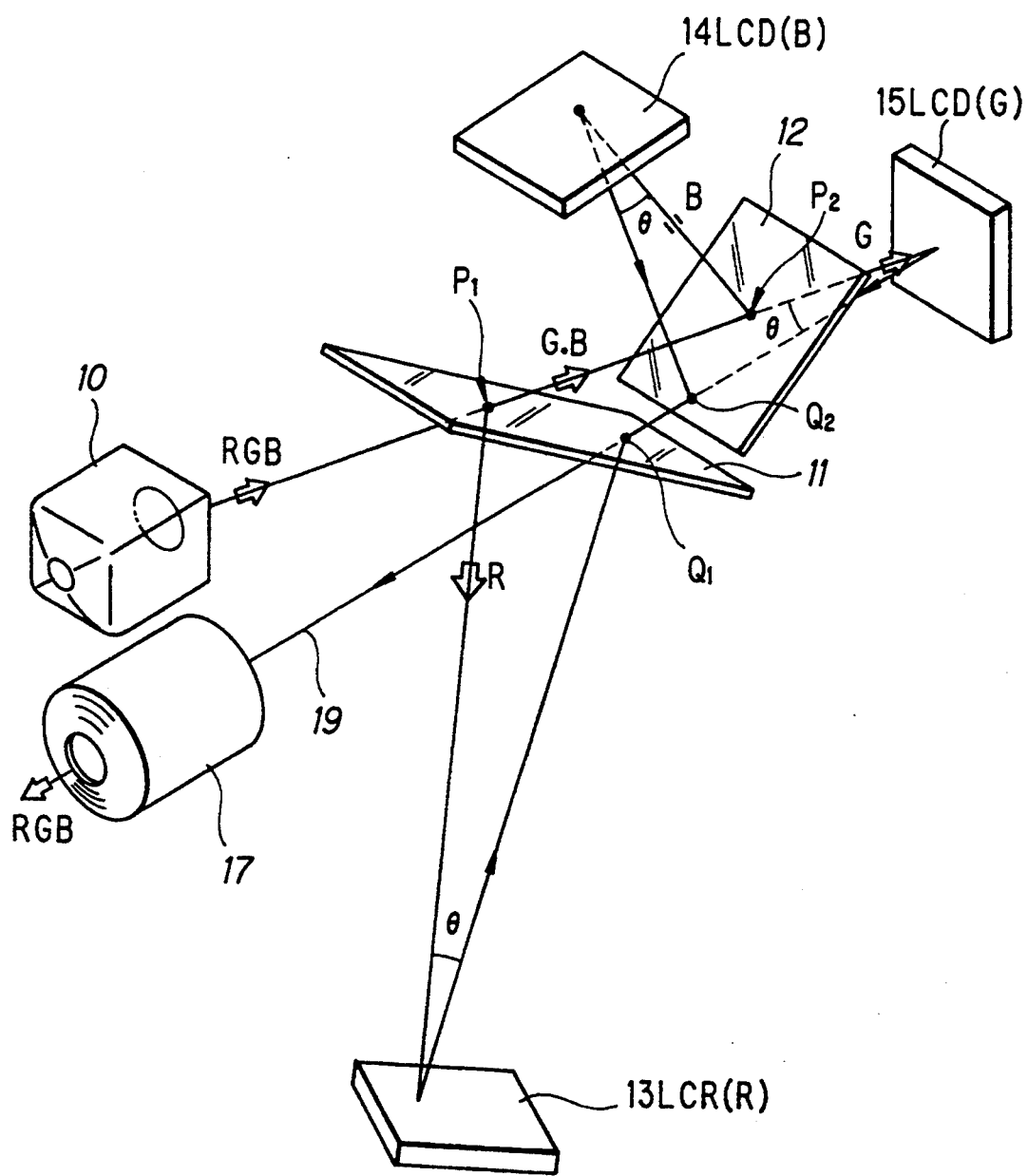
FIG. 2 is a three-dimensional ray diagram of the optical system shown in FIG. 1.

FIG. 2 is a three-dimensional representation of the optical system shown in FIG. 1. Like components are indicated by like reference numerals in FIGS. 1 and 2. R light is reflected at a point $P_1$. Light reflected by the liquid crystal plate 13 is reflected at a point $Q_1$ and directed back to the projection axis 19. B light is reflected at a point $P_2$. Light reflected by the liquid crystal plate 14 is reflected at a point $Q_2$ and directed back to the projection axis 19.

In the three-dimensional representation, the optical axes interconnecting the optical elements are in a space. If necessary, an optical lens for converging light can be placed on some of the optical axes.

Furthermore, it is possible to form an optical path exhibiting appropriate Scheimflug's effects inside the optical lens system 17, for removing small image distortion caused by the fact that the plane of the liquid crystal plate 15 does not intersect with the projection axis 19.

Figure 3A:
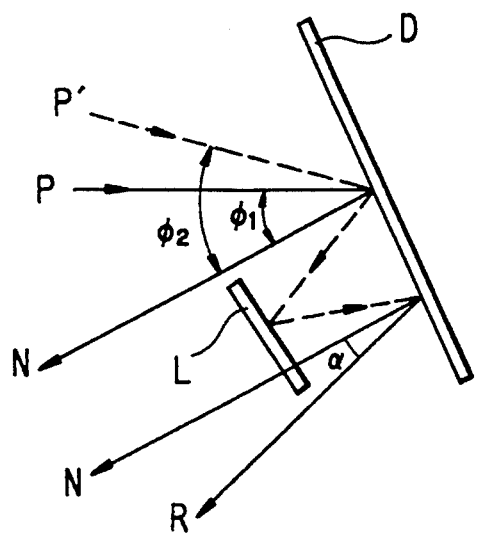
FIG. 3a is a diagram illustrating the relations between the optical axes of light rays incident on a dichroic mirror and the normal to the mirror.

Another projector in which the direction of light incident on dichroic mirrors and the direction of light reflected toward a projection axis are set in three dimensions is now described. The transmitting characteristics of the aforementioned dichroic mirrors vary according to the wavelength of the incident light. Also, these characteristics vary where light P enters at an angle $\Phi_1$ to the normal N to a dichroic mirror D, as shown in FIG. 3a.

Figure 3B:
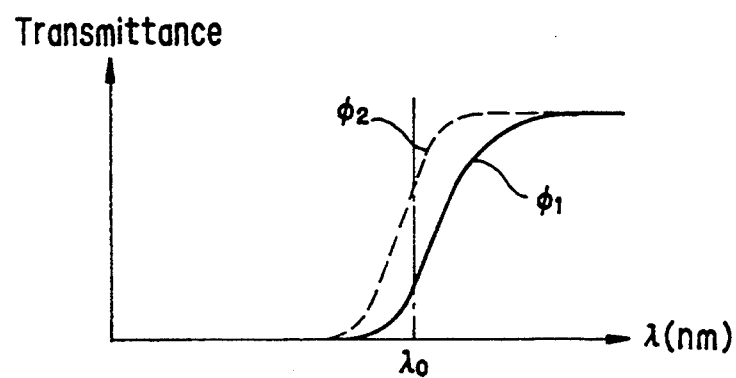
FIG. 3b is a graph showing the light-transmitting characteristics of a dichromic mirror with respect to light rays incident on the mirror at incident angles of $\Phi_1$ and $\Phi_2$, respectively.

It is assumed that the dichroic mirror transmits wavelengths longer than $\lambda_0$, as shown in FIG. 3b for light incident on the mirror at an angle $\Phi$ to the normal N. In FIG. 3b, the light-transmitting characteristic of the mirror is indicated by the solid line. If the incident angle $\Phi$ increases from $\Phi_1$ to $\Phi_2$, its cutoff wavelength $\lambda_0$ shifts toward shorter wavelengths as indicated by the broken line in FIG. 3B. Under this condition, outgoing light R reflected from the liquid crystal plate L toward the projection axis makes an angle $\alpha$ to the normal N to the dichroic mirror.

Figure 4:
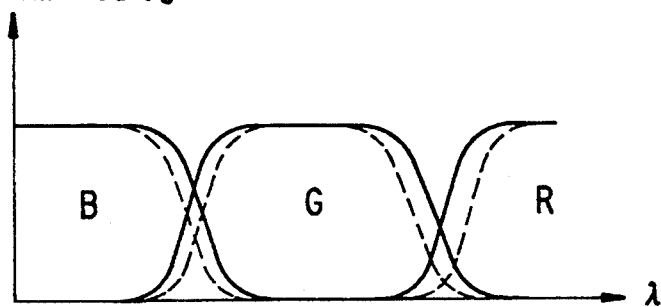
FIG. 4 is a diagram illustrating the color components of an image projected, using dichroic mirrors having different light cutoff wavelengths.

Therefore, where a projector is built, using reflection type liquid crystal plates or image display plates as described above, if the light-transmitting characteristic of the dichroic mirrors for the light first incident on the mirrors differs from the transmitting characteristic for the light emerging from the dichroic mirrors and directed toward the projection axis, then the spectrum of the light rays collected on the projection axis varies from that indicated by the solid line to that indicated by the broken line in FIG. 4. Hence, it is difficult to obtain a projected image having good color hues.

Figure 5:
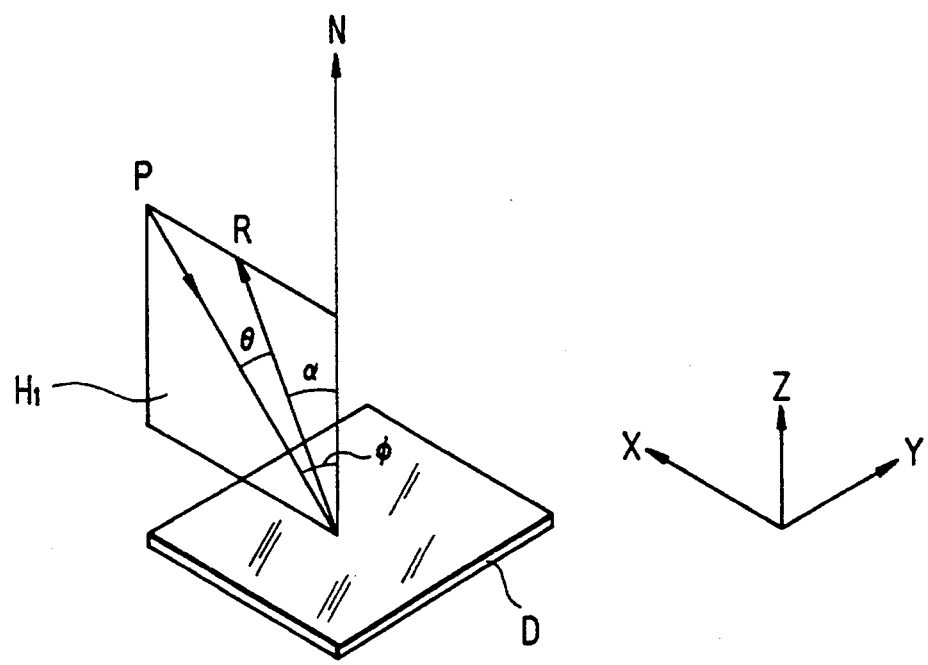
FIG. 5 is a ray diagram illustrating the angles made between optical axes where light incident on a dichroic mirror, a projection axis, and the normal to the mirror are on the same plane.

Referring to FIG. 5, let N be the normal to a dichroic mirror. Let P (vector) be the direction of incident light. Let R (vector) be the direction of reflected light, or the direction of a projection axis. The angles which optical axes form with the normal N are shown in FIG. 5 about the normal N. The angle between the incident light P coming from a light source and the direction R of outgoing light traveling toward the projection axis is indicated by $\theta$. The vector P of the incident light and the vector R of the outgoing light exist in the same plane $H_1$ containing the normal N, as in the principle diagram of FIG. 1 for the projector. In this case, the angle $\theta$ is equal to $\Phi - \alpha$, i.e., $\Phi = \alpha + \theta$. Therefore, in the above case, if the direction of the projection axis, or the vector R, is given, the incident angle $\Phi$ increases linearly with increases in the angle $\theta$. In this way, the difference between the angles $\Phi$ and $\alpha$ becomes conspicuous with undesirable results.

The direction of the incident angle which results in the same angle $\theta$ is not limited to the plane $H_1$. If the angle of a liquid crystal (not shown) acting as a reflecting plate is appropriately set, then light can be made to enter from a circumference at the angle $\theta$ to the vector R of the outgoing light, as shown in FIG. 6.

Figure 6:
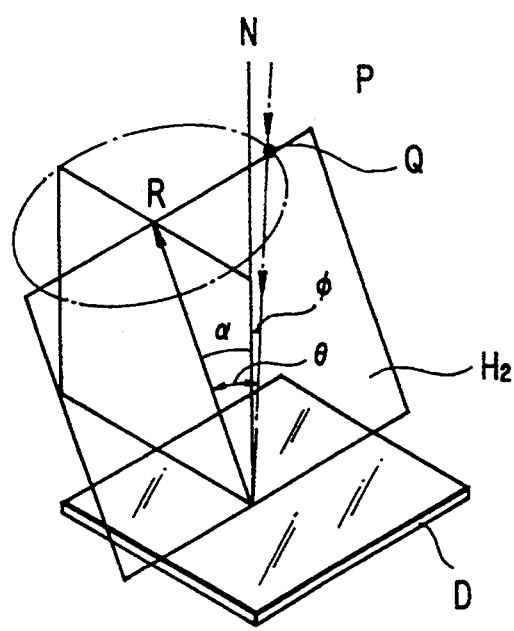
FIG. 6 is a ray diagram illustrating a case in which the axis of light incident on a dichroic mirror and the axis of light (projection axis) exiting from the mirror are on the same plane, and in which this plane is perpendicular to a plane containing both the projection axis and the normal to the mirror.

For example, as shown in FIG. 6, if light is made to enter from a point Q in a plane $H_2$ which is perpendicular to the plane $H_1$ of FIG. 5 and contains the projection axis R, then the same projection axis R can be established as used in FIG. 5. Also, the angle $\theta$ is set equal to the angle of FIG. 5. Although we do not describe the calculation in detail herein, the incident angle $\Phi$ to the dichroic mirror D is given by $$\Phi = \cos^{-1}[\cos \alpha \cdot \cos \theta]$$

Thus, the incident angle $\Phi$ increases at a lower rate with increases in the angle $\theta$.

Figure 7:
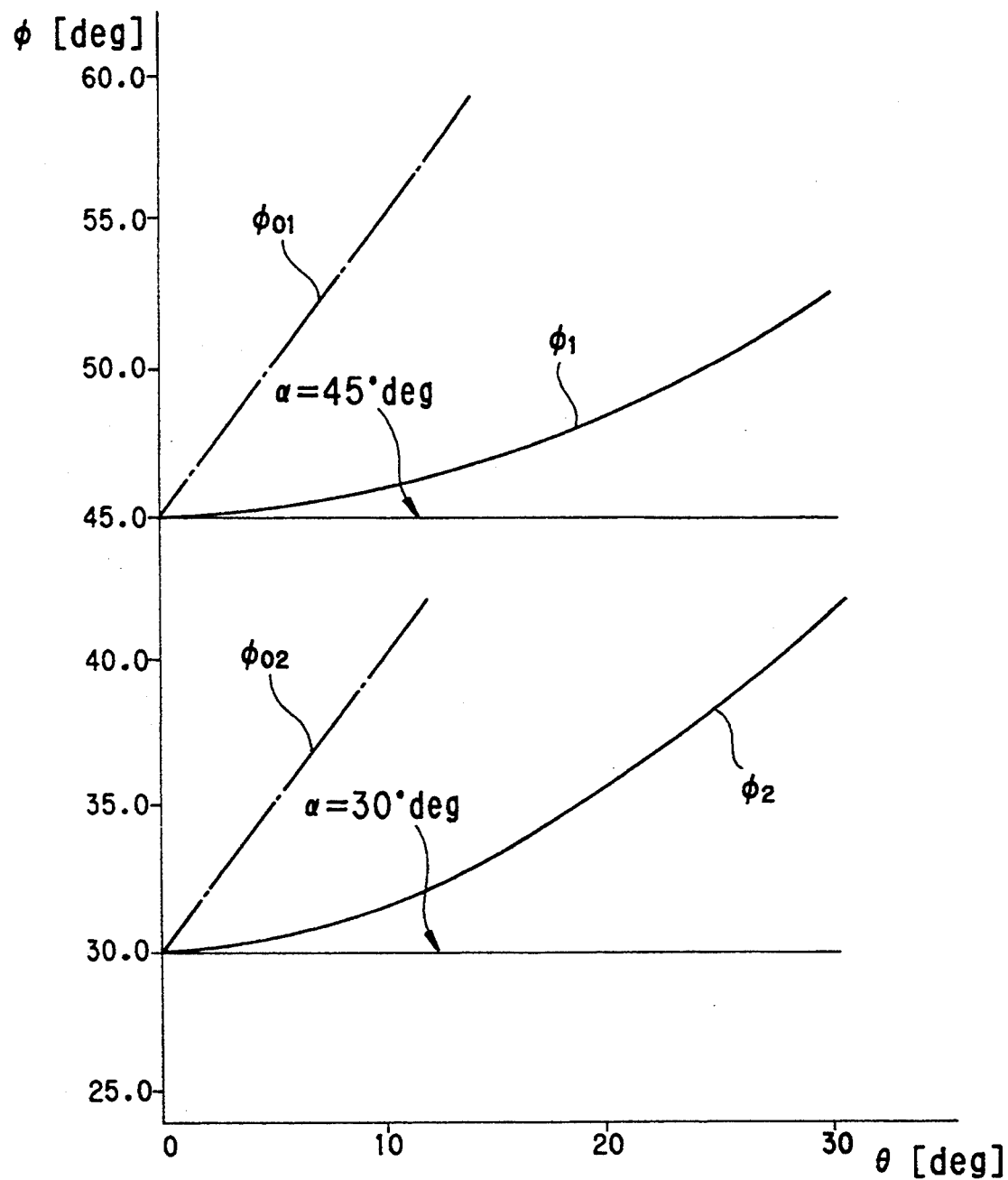
FIG. 7 is a graph showing variations in the incident angle $\Phi$ when the angle $\theta$ varies and the projection axis assumes two angles as shown in FIGS. 5 and 6.

FIG. 7 shows increasing tendencies of the incident angle $\Phi$ for the cases of FIGS. 5 and 6. Line $\Phi_{01}$ indicated by one dot-and-dash line shows a situation in which the projection axis makes an angle $\alpha$ of 45 degrees with the normal in FIG. 5. Line $\Phi_{02}$ indicated by another dot-and-dash line shows a situation in which the projection axis makes an angle $\alpha$ of 30 degrees with the normal in FIG. 5. It can be seen from these lines that the incident angle increases linearly with increases in the angle $\theta$.

On the other hand, a curve $\Phi_1$ indicated by a solid line is obtained by setting the angle $\alpha$ between the projection axis and the normal at 45 degrees, making the direction of the incident light extend perpendicular to the plane $H_1$ containing both the projection axis and the normal to the dichroic mirror as shown in FIG. 6, making the direction of the incident light lie within the plane $H_2$ containing the projection axis R, and making the direction of the incident angle form a given angle $\theta$ with the projection axis. A curve $\Phi_2$ is obtained similarly except that the angle $\alpha$ between the projection axis and the normal is set at 30 degrees. In this case, incident angles $\Phi_1$ and $\Phi_2$ draw mild curves with increasing the angle $\theta$. Where the angle $\theta$ is fixed at 10 degrees, the difference $\Phi - \alpha$ can be set small. The relation between the incident angle $\Phi$ and the angle of reflection $\alpha$ under this condition is shown in the following Table 1,

TABLE 1

| angle $\alpha$ (°) | angle $\phi$ (°) | $\phi - \alpha$ (°) | angle $\alpha$ (°) | angle $\phi$ (°) | $\phi - \alpha$ (°) |
|---|---|---|---|---|---|
| 25 | 26.806 | 1.806 | 45 | 45.864 | 0.864 |
| 26 | 27.731 | 1.731 | 46 | 46.835 | 0.835 |
| 27 | 28.661 | 1.661 | 47 | 47.806 | 0.806 |
| 28 | 29.596 | 1.596 | 48 | 48.779 | 0.779 |
| 29 | 30.533 | 1.533 | 49 | 49.752 | 0.752 |
| 30 | 31.475 | 1.475 | 50 | 50.727 | 0.727 |
| 31 | 32.420 | 1.420 | 51 | 51.701 | 0.701 |
| 32 | 33.367 | 1.367 | 52 | 52.677 | 0.677 |
| 33 | 34.317 | 1.317 | 53 | 53.653 | 0.653 |
| 34 | 35.270 | 1.270 | 54 | 54.630 | 0.630 |
| 35 | 36.225 | 1.225 | 55 | 55.607 | 0.607 |
| 36 | 37.181 | 1.181 | 56 | 56.585 | 0.585 |
| 37 | 38.140 | 1.140 | 57 | 57.563 | 0.563 |
| 38 | 39.101 | 1.101 | 58 | 58.542 | 0.542 |
| 39 | 40.063 | 1.063 | 59 | 59.522 | 0.522 |
| 40 | 41.026 | 1.026 | 60 | 60.501 | 0.501 |
| 41 | 41.992 | 0.992 | 61 | 61.481 | 0.481 |
| 42 | 42.958 | 0.958 | 62 | 62.462 | 0.462 |
| 43 | 43.925 | 0.925 | 63 | 63.443 | 0.443 |
| 44 | 44.894 | 0.894 | 64 | 64.424 | 0.424 | where $\theta$ is the angle made between the vector of incident light and the vector of reflected light and is fixed at 10°, α is the angle made between the normal to a mirror surface and the vector of reflected light, and Φ is the angle made between the normal to the mirror surface and the vector of incident light.

Figure 8A:
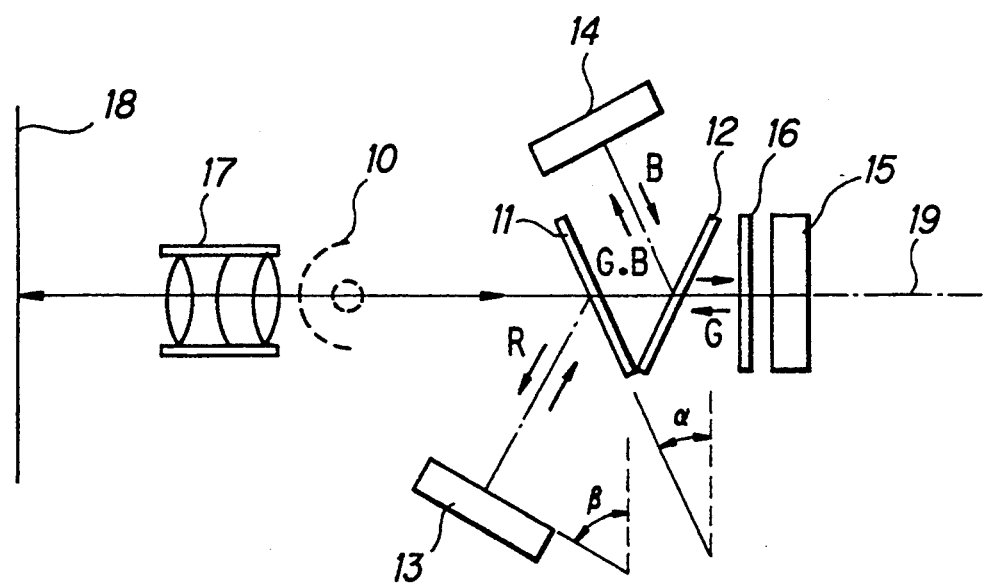
FIG. 8a is a side elevation of another projector according to the invention.
Figure 8B:
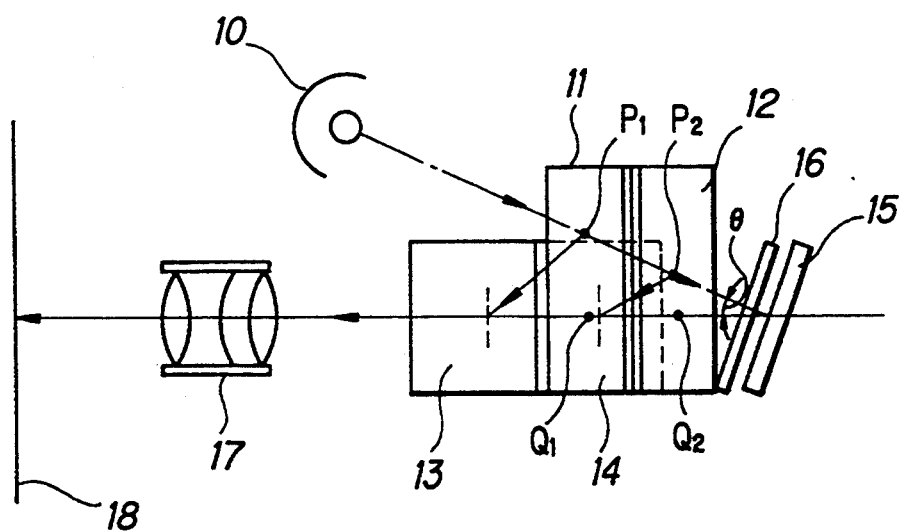
Figure 9:
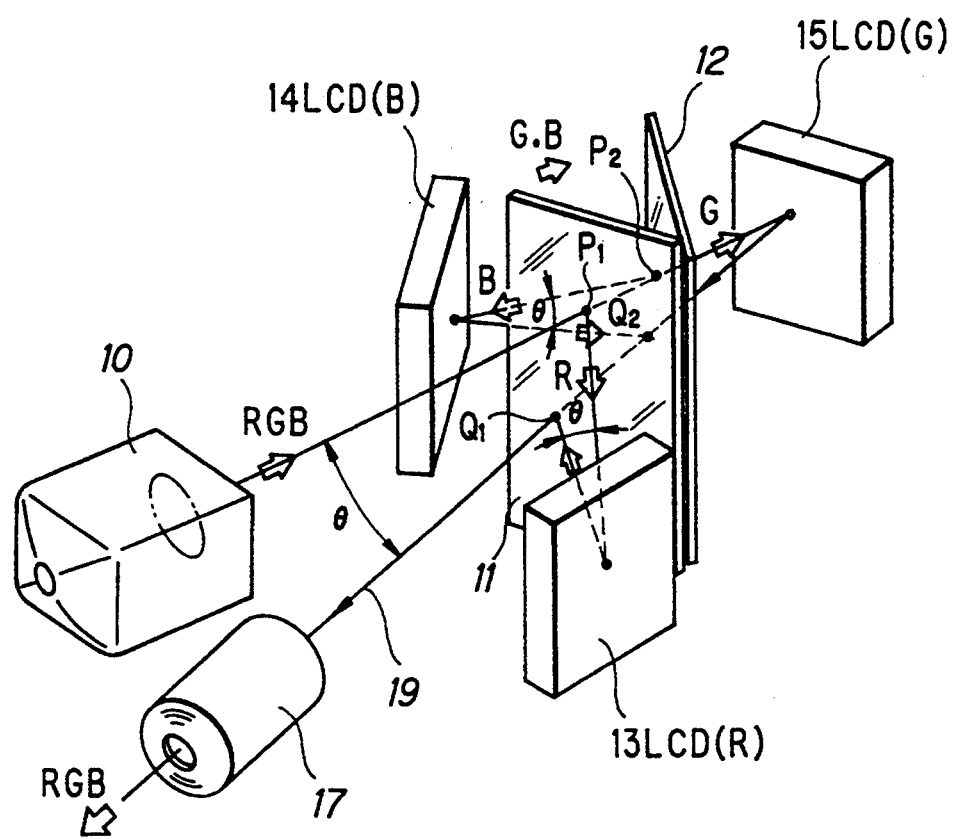
FIG. 9 is a perspective view of a further projector according to the invention.
Figure 10:
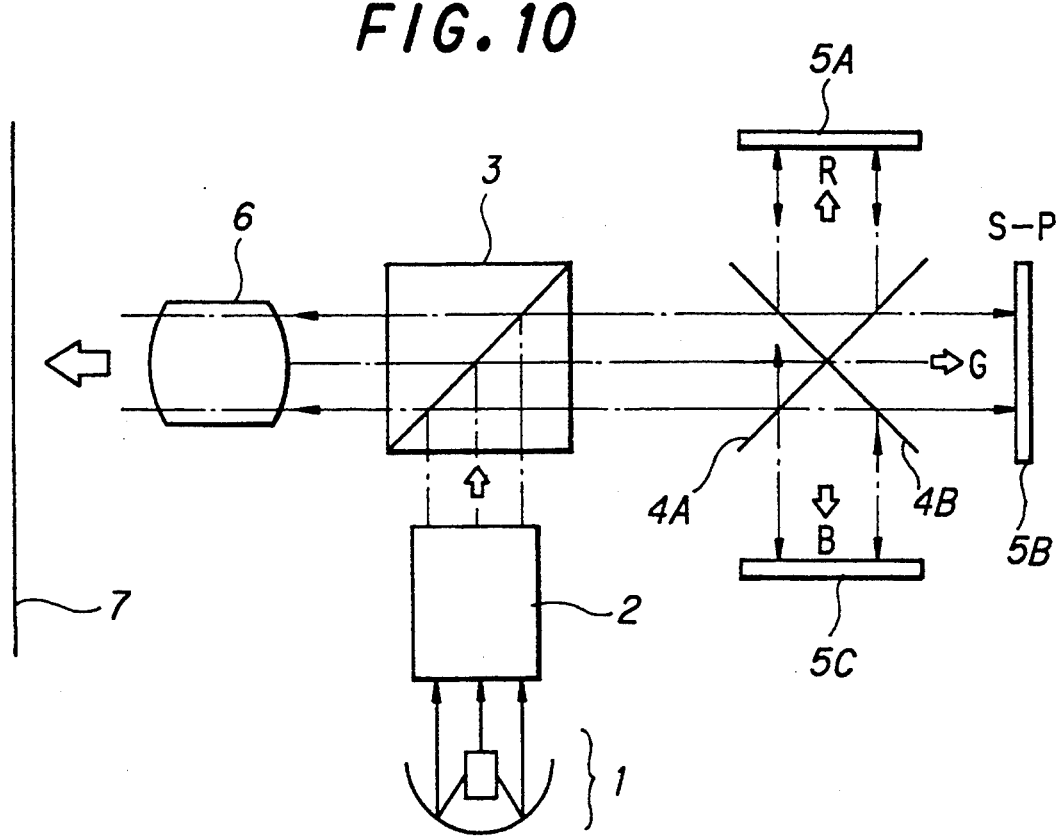
FIG. 10 is an optical diagram of the related art reflection type liquid crystal projector.
Figure 11:
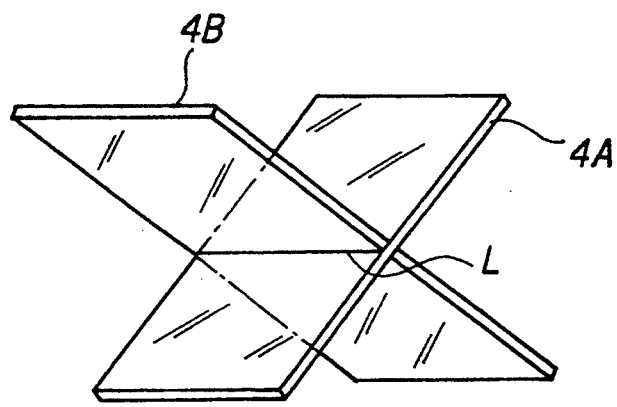
FIG. 11 is a perspective view of the dichroic mirrors shown in FIG. 10.

FIG. 8A is a side elevation of the optical system of the projector when the optical axes are set as shown in FIG. 6. FIG. 8B is a top view of the optical system. Like components are indicated by like reference numerals in various figures including FIG. 1. FIG. 9 is a perspective view of the principle diagrams of FIGS. 8A and 8B.

In FIGS. 8A, 8B, and 9, a light source 10 emits RGB light having a wide range of wavelengths. The RGB light incident on a first dichroic mirror 11 is reflected at a point $P_1$. Red (R) light enters a first liquid crystal plate 13. Reflected light from the first liquid crystal plate 13 is again reflected by the first dichroic mirror 11 and directed toward a projection axis 19 from a point $Q_1$. The light then passes through an optical lens system 17 and is projected onto a screen (not shown).

Of the light transmitted through the first dichroic mirror 11, blue (B) light is reflected at a point $P_2$ on the second dichroic mirror 12 and enters a second liquid crystal plate 14. Light reflected by this second liquid crystal plate 14 is again reflected at the point $Q_2$ on the second dichroic mirror 12. The light then passes through the first dichroic mirror 11, travels along the projection axis 19, and is projected onto the screen.

Green (G) light transmitted through the second dichroic mirror 12 enters the third liquid crystal plate 15 directly or via a filter (not shown) and is reflected by this plate 15. The reflected light then travels along the projection axis 19.

In this embodiment, even if the angle θ between the optical axis of the light emitted from the light source 10 and the projection axis 19 is increased, the increase in the incident angle Φ of the light incident on the dichroic mirror is relatively small as described above. This angle Φ is set close to the angle α made between the normal N and the vector R of the direction of the projection axis. As a result, the wavelength-selecting characteristics of the dichroic mirrors with respect to incident light agree well with the wavelength-selecting characteristics of the mirrors with respect to the light which is reflected by the liquid crystal plates and transmitted through the mirrors. In consequence, a projected image can be obtained without spoiling the balance among the colors.

In the above embodiments, the three primary colors are separated in the order of R, B, and G. The invention is not limited to this order. For example, the order of B, R, and G and the order of G, B, and R can also be used. Furthermore, liquid crystal plates are employed as devices for reflecting the three primary colors. These may be replaced by reflective optical devices or image display devices capable of controlling reflected light from each individual pixel cell.

As described thus far, the novel reflection type projector divides white light into the three primary colors by means of two dichroic mirrors. The separated colors are modulated by reflection type image display plates. Reflected light rays are combined by the same dichroic mirrors and projected onto the same projection axis. Consequently, the novel projector can lower the manufacturing cost as compared with the prior art reflection type projector. In addition, the dichroic mirrors are disposed independent of each other and so the projected image contains no seam. Moreover, an expensive deflecting beam splitter is not used. Thus, the cost can be curtailed further.

Further, the optical axis of light incident on each dichroic mirror is substantially perpendicular to the plane containing the projection axis and the normal to the dichroic mirror, lies within the plane that contains the projection axis, and makes a given angle with the projection axis. This can reduce the difference between the angle of incidence and the angle of reflection. Hence, disturbance of color balance which would normally be caused by the variations in the transmitting characteristics of the dichroic mirrors can be prevented.

What is claimed is:

1. A projector system for projecting image signals, comprising:
   a light source for emitting light containing wavelengths of first, second, and third colors;
   a first image display plate for reflecting incident light to produce first reflected light;
   a first dichroic mirror for directly reflecting wavelengths of said first color emitted by said light source and for projecting these reflected wavelengths onto said first image display plate, said first dichroic mirror reflecting said first reflected light toward a projection axis off said light source;
   a second image display plate for reflecting incident light to produce second reflected light;
   a second dichroic mirror for reflecting wavelengths of said second light transmitted through said first dichroic mirror and for projecting these reflected wavelengths onto said second image display plate, said second dichroic mirror reflecting said second reflected light toward said projection axis;
   a third image display plate for reflecting wavelengths of said third color transmitted through said second dichroic mirror toward said projection axis;
   an optical lens system for receiving said first, second and third colors modulated according to image signals supplied to said first, second, and third image display plates and for projecting color images onto a screen placed on said projection axis; and
   a filter for passing only said third color positioned in front of said third image display plate.

2. The projector system of claim 1, wherein said dichroic mirrors are inclined, and wherein optical axis of light incident on said inclined dichroic mirrors is perpendicular to said dichroic mirrors.

3. A projector system for projecting image signals, comprising:
   a light source for emitting light containing wavelengths of first, second, and third colors;
   a first image display plate for reflecting incident light to produce first reflected light;
   a first dichroic mirror for directly reflecting wavelengths of said first color emitted by said light source and for projecting these reflected wavelengths onto said first image display plate, said first dichroic mirror reflecting said first reflected light toward a projection axis off said light source;
   a second image display plate for reflecting incident light to produce second reflected light;
   a second dichroic mirror for reflecting wavelengths of said second light transmitted through said first dichroic mirror and for projecting these reflected wavelengths onto said second image display plate, said second dichroic mirror reflecting said second reflected light toward said projection axis;

a third image display plate for reflecting wavelengths of said third color transmitted through said second dichroic mirror toward said projection axis; and wherein optical axis of light incident on said dichroic mirrors is substantially perpendicular to a plane containing said projection axis and normals to said dichroic mirrors, exists within a plane containing said projection axis, and makes a given angle with said projection axis.

4. The projector system of claim 3, wherein said given angle is set equal to an angle made between optical axis of light emitted by said light source and said projection axis.

5. A mirror apparatus for use in a projector, comprising:

a light source for emitting light containing wavelengths of first, second, and third colors;

a first image display plate for reflecting incident light to produce first reflected light;

a first dichroic mirror for directly reflecting wavelengths of said first color emitted by said light source and for projecting these reflected wavelengths onto said first image display plate, said first dichroic mirror reflecting said first reflected light toward a projection axis off said light source;

a second image display plate for reflecting incident light to produce second reflected light;

a second dichroic mirror for reflecting wavelengths of said second light transmitted through said first dichroic mirror and for projecting these reflected wavelengths onto said second image display plate, said second dichroic mirror reflecting said second reflected light toward said projection axis;

a third image display plate for reflecting wavelengths of said third color transmitted through said second dichroic mirror toward said projection axis;

an optical lens system for receiving said first, second and third colors modulated according to image signal supplied to said first, second, and third image display plates and for projecting color images onto a screen placed on said projection axis; and a filter for passing only said third color positioned in front of said third image display plate.

6. The mirror apparatus of claim 5, wherein said dichroic mirrors are inclined, and wherein optical axis of light incident on said inclined dichroic mirrors is perpendicular to said dichroic mirrors.

7. A mirror apparatus for use in a projector, comprising:

a light source for emitting light containing wavelengths of first, second, and third colors;

a first image display plate for reflecting incident light to produce first reflected light;

a first dichroic mirror for directly reflecting wavelengths of said first color emitted by said light source and for projecting these reflected wavelengths onto said first image display plate, said first dichroic mirror reflecting said first reflected light toward a projection axis off said light source;

a second image display plate for reflecting incident light to produce second reflected light;

a second dichroic mirror for reflecting wavelengths of said second light transmitted through said first dichroic mirror and for projecting these reflected wavelengths onto said second image display plate, said second dichroic mirror reflecting said second reflected light toward said projection axis;

a third image display plate for reflecting wavelength of said third color transmitted through said second dichroic mirror toward said projection axis; and wherein optical axis of light incident on said dichroic mirrors is substantially perpendicular to a plane containing said projection axis and normals to said dichroic mirrors, exists within a plane containing said projection axis, and makes a given angle with said projection axis.

8. The mirror apparatus of claim 7, wherein said given angle is set equal to an angle made between optical axis of light emitted by said light source and said projection axis.

* * * * *